Jan. 12, 1971  W. J. COLLINS  3,554,040

DEVICE AND METHOD FOR SAMPLING MOLTEN METAL

Filed March 25, 1969

INVENTOR.
WILLIAM J. COLLINS
BY
Charles S. Penfold
ATTORNEY

United States Patent Office 3,554,040
Patented Jan. 12, 1971

3,554,040
DEVICE AND METHOD FOR SAMPLING MOLTEN METAL
William J. Collins, Gary, Ind.
(7005 Madison St., Merrillville, Ind. 46410)
Continuation-in-part of application Ser. No. 713,640, Mar. 18, 1968. This application Mar. 25, 1969, Ser. No. 810,231
Int. Cl. G01n 1/12
U.S. Cl. 73—425.4         13 Claims

ABSTRACT OF THE DISCLOSURE

A molten metal sampler of the type having an elongated tubular housing with a sample receiver fixed therein so that when one end of the housing is immersed in a pool of molten metal a sample will be retained therein. The invention involves a housing in which a localized area is weak so that after the receiving means receives a sample of liquid, the housing may be readily broken in such area to facilitate access to the sample.

---

This application is a continuation-in-part of my application Ser. No. 713,640 filed Mar. 18, 1968, the latter being a continuation-in-part of applications Ser. Nos. 391,654; 590,829 and 649,764.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

An important object of the invention is to provide a device which, among other things, comprises an outer protective housing; means disposed in the housing for receiving a sample of molten metal; supporting means, such as a mass of earthen material, which supports the receiving means in the housing; means providing a lower structure or unit communicating with the receiving means, and providing the housing with a weakened area whereby to facilitate breakage or separation of the housing into sections to obtain access to the sample.

A specific object of the invention is to provide a housing in which the weakened area is protected by a seal.

Additional objects reside in providing a device which offers advantages with respect to manufacture and assembly, efficiency, safety, and destruction whereby to obtain access to the recovered sample or specimen.

Other objects and advantages of the invention will become apparent after the description hereinafter set forth is considered in conjunction with the drawings annexed hereto.

Referring to the drawings.

Figure 1:
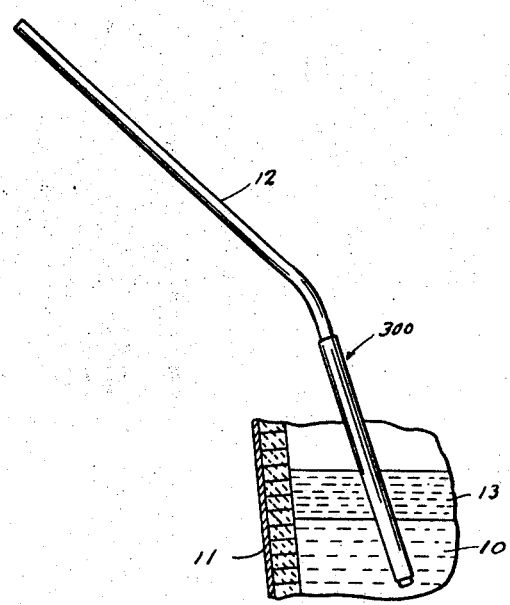
FIG. 1 is a view showing a mode of manipulating a wand connectible to the device for dipping the latter into a bath of molten metal.

The device generally designed at 300, includes a tubular housing 301, constructed of some desirable frangible material such as heavy cardboard, and a unit comprising a plurality of cups 302, 303, 304 and 305 which are operatively connected to define chambers 303', 304' and 305'. The three cups 302, 303 and 304 having rims which bite into the housing when the unit is press-fitted into place and the cup or cap 305 has a rim which preferably engages the lower end of the housing. The bottom wall of the uppermost cup 302 is provided with an opening 306, the bottom wall of cup 303 with an opening 307 and the bottom wall of cup 304 with an opening 308 in which is secured a deoxidizing fusible element 309, such as aluminum. It will be observed that the aperture 307 is offset with respect to a line extending through the axes of the apertures 306 and 308.

The device 300 also preferably includes a relatively long tubular member 310 which is preferably firmly secured in the uppermost cup 302 by a mass of high temperature cement or insulating material 311. An inner tube 312 has a lower extremity firmly secured by the cement in the tubular member 310 and cup 302 and against the bottom wall of the latter in general alignment with the aperture 306. In practice the member 310 is preferably constructed from cardboard, but it is to be understood that any frangible material suitable for this purpose may be utilized.

The device 300 further includes a receiving means or mold structure, generally designated 313, preferably constructed of powdered metal, and the inner tube 312 is preferably constructed from Pyrex glass. It is to be understood that any materials which will withstand high temperatures may be utilized.

Figure 2:
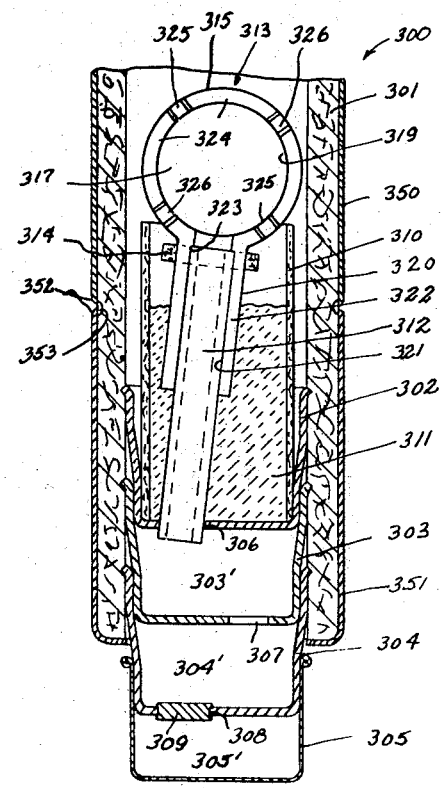
FIG. 2 is a vertical section taken through the device.
Figure 6:
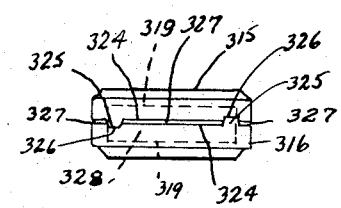
FIG. 6 is a top view of component structure shown in FIG. 2.

The receiving means or mold structure 313 may be designed and constructed in various ways but as exemplified in FIGS. 2 and 6, it is preferably comprised of a pair of half or complementary sections 315 and 316. A ring 314 constitutes a means for maintaining or holding the sections assembled. Each of the sections preferably includes a relatively large annular portion having a bottom wall 317 and wall structure which defines a pocket or recess 319. Each section also preferably includes an integral radial or lateral continuation 320 provided with a semicylindrical groove 321 extending throughout the length of the continuation. Attention is directed to the fact that continuations have opposed longitudinally extending planar edges 322 and that the inner ends of the groove are provided with abutments 323.

The end surface of each of the wall structures of the sections is planar as indicated at 324 and interrupted by a pair of diametrically disposed projections 325 and a pair of diametrically disposed notches or recesses 326 the latter of which are circumferentially spaced 90° apart from the projections. The receiving means or mold structure 313 is preferably so designed and constructed that when the sections are correctly held in assembled relation by the ring 314, the opposed planar surfaces 322 of the continuations 320 will be held in intimate bearing relationship and the projections 325 will be disposed in interfitting or interlocking relationship with the notches 326 whereby to maintain the marginal end surfaces 324 of the wall structures of the sections in a predetermined spaced parallel relationship so that preferably a plurality of three circumferentially spaced arcuate vents or openings 327 are provided through which a fluid such as gas or air may escape when the molten metal is received in the mold structure.

Experimentation and testing has proven that the optimum gap, spacing, or size of the vents or openings should be within a predetermined range for sampling basic oxygen processed steels due to their higher temperatures. More particularly, in this respect, it was initially believed that no vent openings were essential on the basis that the heat of the molten metal would cause the mold sections to separate and release the trapped gases. However, failures did occur in practice so tests were conducted which proved that the size of the vent or vents was critical in certain structures. It was discovered that a relatively small vent or a narrow gap between the large portions of the sections caused back pressure and restrained the molten metal from entering and completely filling the receiving means or mold cavity. It was further discovered that a vent of relatively large size or an excessive gap between the large portions of the sections caused the molten metal to bleed through the vent and seal the sections together thereby resulting in obtaining a porous test sample of poor quality.

Attention is directed to the fact that the projections and notches constitute means which assist in assembling, locating, aligning, or placing the sections in registry; that the pockets 319, in combination, define a chamber 328 which finally receives the molten metal; that the longitudinal grooves 321 in the continuations, in combination, define a tubular formation or socket which snugly receives one extremity of the glass tube 312 which engages the abutments 323 for limiting inward movement of the tube; and that the lower extremity of the glass tube extends beyond the continuations and through the aperture 306 in the cup 302, and is secured in place by the surrounding cement 311 in the member 310. It will be apparent that the tube 312 is also firmly anchored in place by the cement 311; that the cement within the confines of the tube 312 assists in sealing and securing the glass tube in the socket, the inner ends of the continuations together and the glass tube in the aperture 306 so that the molten metal will flow through the glass tube prior to reception in the chamber 328 of the receiving means 313. It will be observed that the longitudinal axes of the receiving means 313 and glass tube 312 are coincidental and inclined with respect to the longitudinal axis of the housing 301. It is to be understood that the device may be made in which the aforementioned axes may be in alignment with the longitudinal axis of the housing or parallel thereto.

In view of the foregoing, it should be manifest that the structure as described above, comprises the housing 301, the tubular member 310 which is supported by a mass of material 311 which is highly resistant to heat deterioration; that the means 313 is disposed within the confines of the housing and is provided with a chamber 328 which communicatively connects with the upper end of the tube 312; that means which may comprise one or more of the cups 302, 303, and 304 provide at least a second chamber which communicatively connects with the lower end of the tube 312 for initially receiving a liquid for transmission into said tube and the chamber 328; and that means, such as the fusible element 309, serves to condition the fluid in the second chamber prior to its reception into the tube 312.

he device exemplified in FIG. 2 also preferably includes an external shield structure, preferably of steel, which comprises an upper elongated tubular section 350 and a lower shorter tubular section 351. The inner ends of these sections are preferably bevelled as indicated at 352. The sections are preferably press-fitted onto the housing so that the bevelled ends abut one another. When the device is immersed in molten metal the latter will burn away or char at least on annular portion of the housing in an area between the sections to facilitate breakage or separation of the housing in such area after the device is removed with the sample. It is to be understood that if found desirable, the housing may be scored or grooved as at 353 in the area mentioned herein to promote severance of the lower portion of the housing, receiving means and lower section of the shield more or less as a unit whereby to facilitate access to and removal of the sample from the device.

Figure 3:
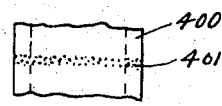
FIG. 3 is a partial elevational view of a modified device.

In FIG. 3 there is shown a housing 400, preferably of cardboard, having an intermediate area, annular portion 401 which is preferably of a frangible character whereby to facilitate breakage of the housing to obtain quick removal of a receiving means and sample therein.

Figure 5:
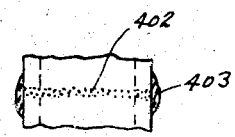
FIG. 5 is a partial elevational view of a modified structure.

The device depicted in FIG. 5 is similar to that shown in FIG. 3 and has an annular area 402, corresponding to the area 401, which is surrounded or concealed by an outer ring, band or seal 403 of a frangible material, such as a ceramic, which serves to initially protect the area 402 while the device is immersed. After the device is removed, the housing may be readily separated at the area 402 by breaking the seal.

Figure 4:
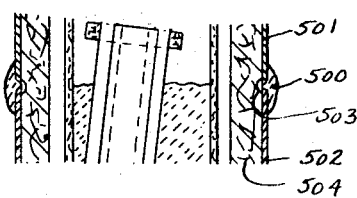
FIG. 4 is a partial vertical section of a modified structure.

The device shown in FIG. 4 substantially corresponds to that depicted in FIG. 2, and includes a ring, band or seal 500 preferably having frangible meltable characteristics, such as a ceramic, which protects the opposed end margins of outer sheath sections 501 and 502 and a weakened or grooved area 503 of a housing 504 while the device is immersed in a bath of molten metal. More particularly, the band or ring may be a ceramic or material of either a foreign metallic, nonmetallic, organic or nonorganic substance to momentarily prevent adherence of freezing molten metal adhering to the breakage or joint area. The freezing metal phenomena is typically referred to as sculling over and would provide an additional metallic band or jacket about the housing, thus preventing ready access to the sample. After the device is removed, the sections may be readily separated when the seal is broken.

The device is adapted to be dipped into a bath 10 of molten metal contained in a vessel 11. More particularly, an elongated wand 12 is detachably connected to the housing 301 of the device to facilitate immersing the lower extremity of the device through a layer of slag 13 on the bath 10. The device is held in a bath for a very brief period of time, for example, from three to ten seconds.

The cup 305 and the mass of cement or insulating material 311 and an annular space about the receiving means, serve to momentarily insulate the interior of the device as it is being inserted into the bath and the cup or cap protects the device against any premature admission of any slag and/or impurities until the lower end of the device is well below the slag 13. The cup disintegrates or otherwise enables the molten metal to melt the element 309, the latter diffusing into the metal for deoxidizing the same as it tortuously flows through the opening 308, chamber 304', opening 307, chamber 303' into the receiving means 313 via the tube 312. The deoxidation substantially occurs in the chambers 304' and 303' although some may occur in chamber 305' prior to entry of the metal into the chamber 304'. After a few seconds or a sufficient time interval has elapsed in order to permit filling of the receiving means 313 and tube 312, the device is quickly lifted from the bath of molten metal and then may be subjected to a cooling medium, such as cold water, a blast of cool air or it may be placed on a work bench and allowed to cool. In any event, the sample retrieved from the molten bath is not utilized until after it has solidfied and cooled to such an extent that it can be operated on for analysis. The specimen or sample solidifies or begins to solidify while the device is immersed in the molten metal. It is desirable that the analysis of the specimens be obtained expeditiously so that that it may be quickly analyzed in order to determine or ascertain whether the molten metal is in accord with preselected or predetermined specifications or requirementes. If, for example, the specimen indicates that the molten metal is not of the character desired, then the metal in the vessel 11 may be modified or changed. In some instances, it may be necessary to obtain more than one sample or specimen of the molten metal before the latter is brought up to a required standard.

The device, upon being subjected to the molten metal, deteriorates or becomes damaged to some extent. For example, the cup or cap 305, in some instances may be completely distintegrated into the molten metal and in other instances, a portion of the cup may still remain attached to the cup 304. Moreover, in some instances, portions of the cups 304 and 303 may disintegrate. In other words, the disintegration or destruction of various components of the device is dependent on their design and construction, the temperature of the molten metal, and the time that the device is held in the latter.

After a sample more-or-less in a lollypop form has been cast, certain of various components such as the housing 301, tubular member 310, sections 315 and 316, glass tube 312 and cups may be readily separated, destroyed, disintegrated, or broken apart so as to obtain the sample.

Having thus described my invention, it is obvious that various modifications may be made in the same without departing from the spirit of the invention, and therefore, I do not wish to be understood as limiting myself to the exact forms, construction, arrangements, and combinations of parts herein shown and described.

I claim:

1. A device of the kind described comprising: a nonmetallic housing, means for receiving a sample of molten metal disposed at a predetermined location in said housing, and said housing having an intermediate localized frangible area which may be broken whereby to obtain access to said receiving means.

2. A device of the kind described comprising: a housing containing means for receiving a hot liquid, a sheath comprising a pair of sections surrounding said housing for protecting the latter when the device is dipped into a hot liquid, said housing being partable in an area between said sections.

3. The device defined in claim 2, in which said housing is tubular, said sections are tubular and disposed in an end-to-end relationship, and said housing is provided with a weakened area between said sections whereby to facilitate parting of said housing at said area.

4. The device defined in claim 2, in which said area is protected by a breakable band.

5. A device for the purpose described comprising: a frangible housing, means disposed in said housing for receiving a sample of hot liquid when the device is dipped into a bath of hot liquid, and said housing being provided with an intermediate localized readily breakable area adjacent said receiving means whereby to facilitate parting of said housing to afford ready access to said receiving means.

6. The device defined in claim 5, in which said area is protected by an external removable sealing band.

7. A device of the kind described comprising: a housing, means for receiving a sample of a hot liquid carried by said housing, said housing comprising a pair of relatively strong portions and an intermediate weakened area whereby to promote breakage thereof to facilitate access to a sample after reception by said receiving means.

8. The device defined in claim 7, in which said area is protected by a seal.

9. The device defined in claim 7, in which said housing is tubular, and a band of material protects said area.

10. The device defined in claim 7, including a metal sheath disposed about said housing and said sheath is comprised of a pair of sections having ends disposed at said area.

11. A device of the kind described comprising: a frangible housing, means for receiving a sample of hot liquid disposed in said housing, a sheath disposed about said housing and comprised of a pair of sections having ends located in an area adjacent to said receiving means whereby to facilitate breakage of said housing at said area.

12. The devce defined in claim 11, in which said area is weaker than the remainder of said housing.

13. A device of the kind described comprising: an elongated frangible housing, means disposed in said housing for receiving a sample of molten metal, a sheath disposed about said housing and comprised of a pair of sections having ends located in opposed relation in an area of said housing intermediate its length whereby when the device is dipped into a bath of molten metal the metal will cause disintegration of at least a portion of said area whereby to facilitate breakage of said housing at such area after the device is removed from the bath to obtain access to said receiving means and sample therein.

References Cited

UNITED STATES PATENTS

| | | | |
|---|---|---|---|
| 3,369,406 | 2/1968 | Lowdermilk | 73—421 |
| 3,306,783 | 2/1967 | Silver | 136—234 |
| 3,390,578 | 7/1968 | Moore | 136—234 |

S. CLEMENT SWISHER, Primary Examiner